(12) United States Patent
Yang et al.

(10) Patent No.: US 8,219,136 B2
(45) Date of Patent: Jul. 10, 2012

(54) TECHNIQUES TO DETERMINE TRANSMITTER POWER

(75) Inventors: Rongzhen Yang, Shanghai (CN); Hujun Yin, San Jose, CA (US); Wei Guan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 12/322,903

(22) Filed: Feb. 9, 2009

(65) Prior Publication Data

US 2010/0203917 A1    Aug. 12, 2010

(51) Int. Cl.
H04B 7/00    (2006.01)
H04B 17/00   (2006.01)
H01Q 11/12   (2006.01)

(52) U.S. Cl. ..... 455/522; 455/69; 455/127.1; 455/67.11

(58) Field of Classification Search .......... 455/552, 455/69, 127.1
See application file for complete search history.

(56) References Cited

U.S. PATENT DOCUMENTS

| | | | | |
|---|---|---|---|---|
| 7,020,482 | B2 * | 3/2006 | Medvedev et al. | 455/522 |
| 7,158,285 | B2 * | 1/2007 | Yoshida | 359/334 |
| 2005/0100343 | A1 * | 5/2005 | Yoshida | 398/177 |
| 2006/0051022 | A1 * | 3/2006 | Levner et al. | 385/37 |
| 2006/0116155 | A1 * | 6/2006 | Medvedev et al. | 455/522 |

OTHER PUBLICATIONS

Yih-Shen Chen et al., Joint Power Control and Link Adaptation Scheme for IEEE 802.16m. IEEE. Jul. 12, 2008.
Zhaohua Lu et al., Power Control Based on Interference Management for Uplink. IEEE. Jul. 10, 2008.
Sophie Vrzic et al., Proposal for IEEE 802.16m Uplink Power Control. IEEE. Jul. 15, 2008.
Fan Wang et al., IEEE 802.16m UL Fractional Power Control. IEEE. Jun. 7, 2008.
Xiaoyi Wang et al., Interference Constraint Power Control. IEEE. Jul. 7, 2008.
Ali Taha Koc et al., Uplink Power Control Recommendations for IEEE 802.16m. IEEE. Jul. 13, 2008.
Jihyung Kim et al., Uplink Power Control in the Base Station. IEEE. Jul. 14, 2008.
Jeongho Park et al., Uplink Power Control in 802.16m. IEEE. Jul. 7, 2008.
Kanchei (Ken) Loa et al., Power Control in 802.16m. IEEE. Jul. 16, 2008.
JueJun Liu et al., Uplink Power Control of 16m. IEEE. Jul. 7, 2008.
Dong-Cheol Kim., Uplink Power Control Design—Considerations and Mechanism. IEEE. Jul. 7, 2008.

* cited by examiner

*Primary Examiner* — Tilahun B Gesesse
(74) *Attorney, Agent, or Firm* — Blakely, Sokoloff, Taylor & Zafman LLP

(57) ABSTRACT

Techniques are described that can be used to determine a transmitter power level of a mobile station based on spectrum efficiency gain and loss. Spectrum efficiency gain is measured for a home sector base station. Spectrum efficiency loss is measured for base stations other than the home sector base station. In one example, a base station transmits information such as noise plus interference level to a mobile station and the mobile station determines the transmitter power level. In another example, the mobile station transmits information such as preamble signal strength and preamble total signal strength to the home sector base station and the home sector base station determines the transmitter power level and instructs the mobile station to apply the determined transmitter power level.

26 Claims, 3 Drawing Sheets

TECHNIQUES TO DETERMINE TRANSMITTER POWER

FIELD

The subject matter disclosed herein relates generally to techniques to determine transmitter power of a wireless signal.

RELATED ART

In wireless networks, determination of wireless signal strength is an important decision. Increasing transmission power of one mobile station enjoys the increase of its link performance but increases interferences to other mobile stations of neighboring base stations because they use the same channel. This results in decreased link performance of the other mobile stations. Therefore, in deciding transmission power, it is important to balance the performance of a particular link with interference to the other base stations.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
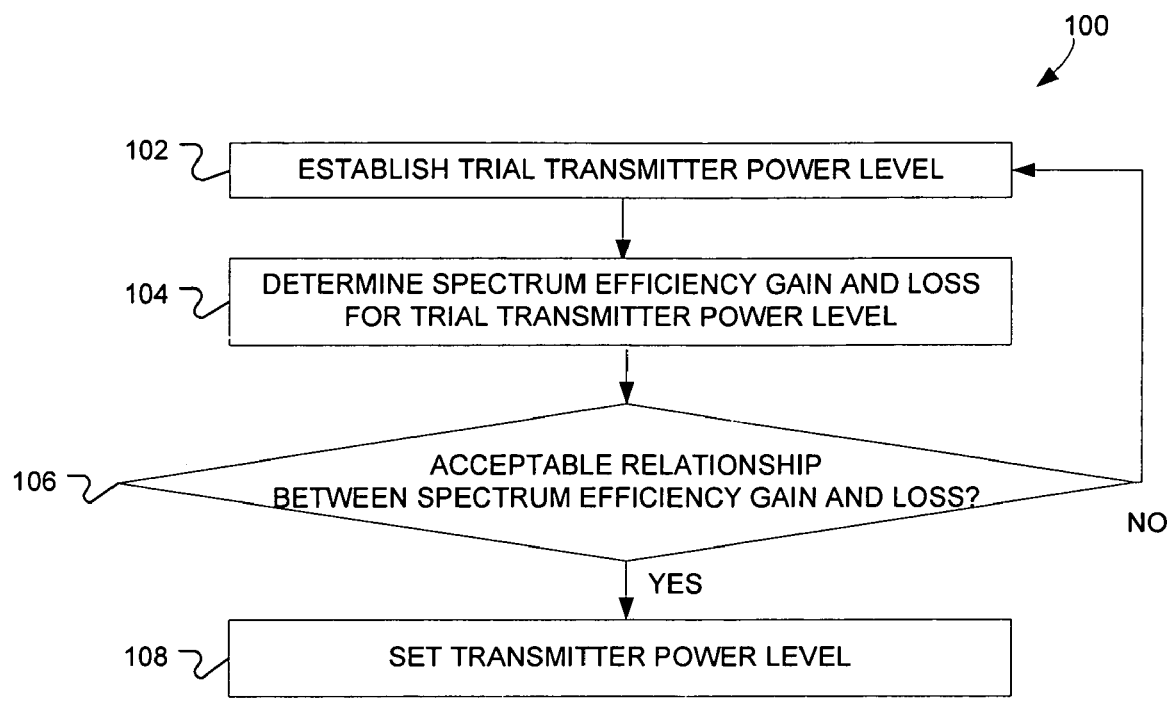
FIG. 1 depicts a process that can be used to determine a transmitter power for a mobile station, in accordance with an embodiment.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11h, 802.11i, 802.11n.

Some embodiments determine transmitter power of a mobile station based on spectrum efficiency. Spectrum efficiency gain for a home sector base station is measured for a transmitter power level. Spectrum efficiency loss for other base stations is measured for the same transmitter power level. If the spectrum efficiency gain is less than or equal to spectrum efficiency loss, then the transmitter power level is used by a mobile station. If the spectrum efficiency gain exceeds spectrum efficiency loss, then the transmitter power level is incremented to another level and spectrum efficiency gain and loss are determined for the other level. In some embodiments, the mobile station determines its own transmitter power level, whereas in some embodiments, a base station determines the transmitter power level of the mobile station. Techniques described herein can be applied to OFDMA-based wireless broadband technologies and related products, such as but not limited to IEEE 802.16e, IEEE 802.16m, 3GPP LTE, and 3GPP UMB c, to increase system uplink throughput (i.e., transmission rates from mobile station to base station) significantly with acceptable interference to other base stations.

FIG. 1 depicts a process 100 that can be used to determine a transmitter power $P_X$ for a mobile station, in accordance with an embodiment. Block 102 may include establishing a trial transmitter power level. The transmitter power level, $P_{Trial}$, can be initialized to zero and increased by step $\Delta P$ for each iteration of process 100. $P_{Trial}$ represents the current trial transmitter power level.

Block 104 may include determining spectrum efficiency (SE) gain and loss, respective $SE_{gain}$ and $SE_{loss}$, for the trial transmitter power level. The key input parameters to determine $SE_{gain}$ and $SE_{loss}$ are path loss (PL) and noise plus interference level (NI). Techniques for determining path loss and noise plus interference level are well known and described, for example, in sections 8.3.7.4.2, 8.4.10.3.2, 8.4.11.3, 8.4.5.3.19, and 8.3.9.3 of IEEE 802.16 Rev2/D7 (October 2008). Path loss $PL_0$ represents the path loss from a mobile station to its home sector base station whereas path loss $PL_1$, $PL_2$, ..., $PL_N$ represent the path loss from the mobile station to the top N base stations that are interfered most significantly by this mobile station on uplink. The mobile station receives a strongest signal from the home sector base station.

Noise plus Interference level (NI) is expressed as the sum power level of noise and interferences. $NI_0$ represents a noise plus interference level of a home sector station whereas $NI_1$, $NI_2$, ..., $NI_N$ represent noise plus interference level of other base stations. $NI_1$, $NI_2$, ..., $NI_N$ may be exchanged among base stations by a network connection or may be approximated. NI can also be transformed from/to Interference Over Thermal (IoT) using the following relationship:

$$NI = IoT \times P_{Noise} + P_{Noise}$$

where, $P_{Noise}$ is the thermal noise power level. Thermal noise power level can be calculated from the following formula: $P_{dbm} = -174 + 10\log(f)$, where f is the bandwidth of the communication system.

In an embodiment, spectrum efficiency gain at the home sector base station for a mobile station can be determined using the following formula:

$$SE_{gain} = \log\left(\frac{1+SINR_{New}}{1+SINR_{Orig}}\right)$$

where, SINR is Signal to Interference plus Noise Ratio,
$SINR_{New}$ is the SINR for power level $P_{Trial}$, and
$SINR_{Orig}$ is the SINR for the trial transmitter power level immediately before its increase by $\Delta P$.

More specifically, for the home sector base station, the following represent the original and new SINR:

$$SINR_{Orig} = \frac{P_0/PL_0}{NI_0}$$

$$SINR_{New} = \frac{(P_0+\Delta P)/PL_0}{NI_0}$$

After increasing the power of this mobile station to the trial transmitter power level, the spectrum efficiency gain can be represented as:

$$SE_{gain} = \log\left(1 + \frac{\frac{\Delta P}{PL_0}}{NI_0 + \frac{P_0}{PL_0}}\right)$$

Spectrum efficiency loss to the base stations other than home sector base stations due to the power increase of the mobile station can be expressed as:

$$SE_{loss}(i) = \log\left(1 + \frac{\Delta I_i}{NI_i}\right) - \log\left(1 + \frac{\Delta I_i}{S_i + NI_i}\right)$$

where, $$\Delta I_i = \frac{\Delta P}{PL_i} \text{ and}$$

$S_i = P_{Noise} \times SNR_i$ and represents the useful signal power at the $i^{th}$ neighbor base station.

In an embodiment, spectrum efficiency loss can be represented as the sum of all spectrum efficiency losses at neighboring base stations other than the home sector base station using the following formula:

$$SE_{loss} = \sum_{i=1}^{N} SE_{loss}(i)$$

Block 106 may include determining whether the relationship between spectrum efficiency gain and spectrum efficiency loss are acceptable for the trial transmitter power, $P_{Trial}$. In one embodiment, if $SE_{gain} > SE_{loss}$, then block 102 follows block 106 and process 100 repeats. In a next iteration, the trial transmitter power, $P_{Trial}$, is increased by $\Delta P$. However, if $SE_{gain} <= SE_{loss}$, then $P_{Trial}$ from block 102 is the decided transmitter power for the current selected mobile station. Increasing a mobile station's power level will increase its own SE gain, at the cost of SE loss in neighboring base stations. The condition $SE_{gain} <= SE_{loss}$ indicates that the predicted SE losses in all neighboring base stations equals or outweighs the SE gain in the home sector. So if the condition is satisfied, increasing power level further is not beneficial in terms of net SE change in all sectors.

Figure 2:
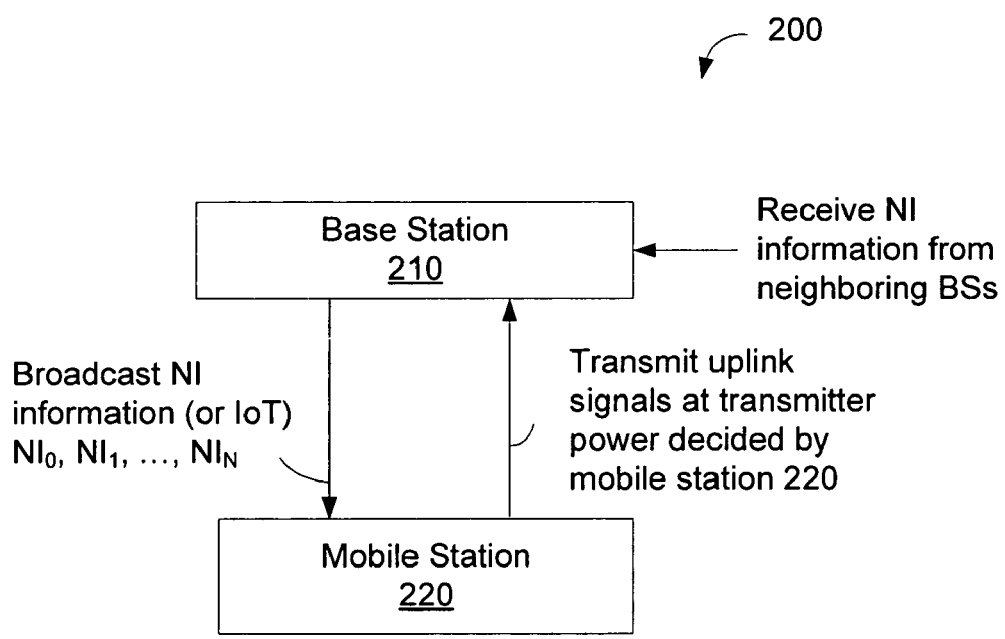
FIG. 2 depicts in block diagram format a system that determines transmitter power using Open Loop Power Control (OLPC), in accordance with an embodiment.

The process of FIG. 1 can be used to determine transmitter power in Open Loop Power Control (OLPC) and Closed Loop Power Control (CLPC) configurations. FIG. 2 depicts in simplified high level block diagram format a system 200 that determines transmitter power using Open Loop Power Control (OLPC), in accordance with an embodiment. The NI information or IoT are exchanged between base station 210 and neighboring base stations (not depicted) by using a network (e.g., backhaul network). Base station 210 broadcasts the collected NI information, i.e., its own and neighbor base stations' NI to mobile station 220 and other local mobile stations (not depicted). If there is no information exchange among base stations, base station 210 may broadcast to mobile station 220 its own noise plus Interference level as an approximation of noise plus interference levels for all base stations.

Mobile station 220 determines the estimated path loss $PL_0$, $PL_1$, $PL_2$, ..., $PL_N$ based on a preamble signal from base station 210. Preamble signal is defined in sections 8.4.4.2 and 8.4.6.1.1 of IEEE 802.16 Rev2/D7 (October 2008). For example, suitable techniques to determine path loss estimation from the preamble signal strength from base station 210 and neighboring base stations are described at page 693, lines 57-59 and page 1113, lines 11-14 in IEEE 802.16 Rev2/D7 (October 2008). In an embodiment, mobile station 220 executes process 100 of FIG. 1 to determine its transmitter power based on the estimated $PL_0$, $PL_1$, $PL_2$, ..., $PL_N$ and the noise plus interference levels provided by base station 210.

Figure 3:
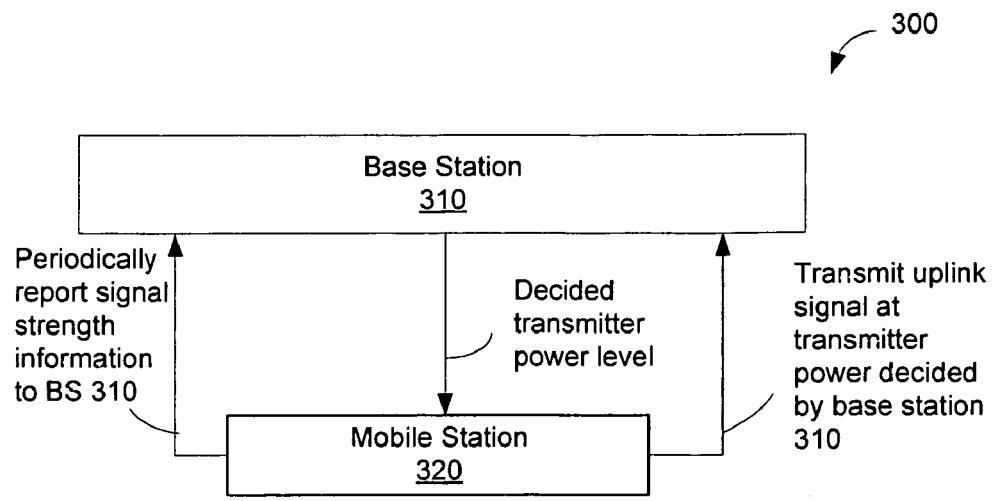
FIG. 3 depicts a block diagram of a system that determines the transmitter power of a mobile station using Closed Loop Power Control (CLPC), in accordance with an embodiment.

FIG. 3 depicts a simplified high level block diagram of a system that determines the transmitter power of a mobile station using CLPC, in accordance with an embodiment. In this embodiment, base station 310 does not broadcast noise plus interference level (or Interference Over Thermal) information to mobile station 320. Instead, mobile station 320 reports information to base station 310 and base station 310 uses the information to determine path loss information results $PL_0$, $PL_1$, $PL_2$, . . . , $PL_N$. In an embodiment, the information includes path loss estimation results using MAC level signaling based on a preamble signal strength from base station 310 and neighboring base stations. In another embodiment, the information includes both preamble signal strength (for example, Carrier to Interference-plus-Noise Ratio level) and preamble total signal strength (signal strength including interference). For example, suitable techniques to determine path loss estimation from the preamble signal strength from base station 310 and neighboring base stations or both preamble signal strength and preamble total signal strength are described at page 693, lines 57-59 and page 1113, lines 11-14 in IEEE 802.16 Rev2/D7 (October 2008). Base station 310 calculates path loss based at least on reported information from mobile station 320.

Base station 310 determines transmitter power using the process 100 of FIG. 1 based on the path loss information and noise plus interference level information. Noise plus interference level information may be determined in a manner described with regard to FIG. 2. Base station 310 transmits the decided transmitter power to mobile station 320 so that mobile station 320 can transmit signals using the decided transmitter power.

Figure 4:
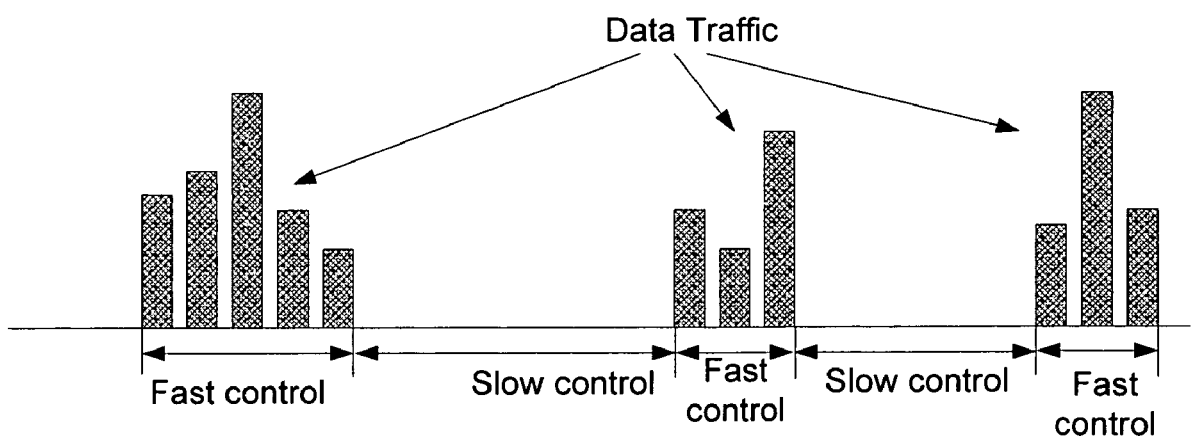
FIG. 4 depicts scenarios in which CLPC or OLPC may be used to determine transmitter power, in accordance with an embodiment.

FIG. 4 depicts scenarios in which CLPC or OLPC may be used to determine transmitter power, in accordance with an embodiment. OLPC can be the default scheme to adjust uplink transmit power from a mobile station. OLPC may provide the slow power control for slow fading but has an advantage of less signal overhead than that of CLPC. Signal overhead refers to radio resources used to feedback the path loss and unicast the decided power level. When data packets are transmitted, CLPC can be used. CLPC can piggyback information used to determine transmitter power on the data traffic for the fast control. For example, only a few bits combined with resource allocation information element (IE) (e.g., downlink map or uplink map information element) can be used to transmit power control information used to determine transmitter power. Downlink map and uplink map are defined, for example, at page 15, lines 24-26; page 83, section 6.3.2.3.2 in IEEE 802.16 Rev2/D7 (October 2008). For general status, CLPC may provide fast power control but incur signal overhead for unicast of decided transmitter power to each mobile station.

Figure 5:
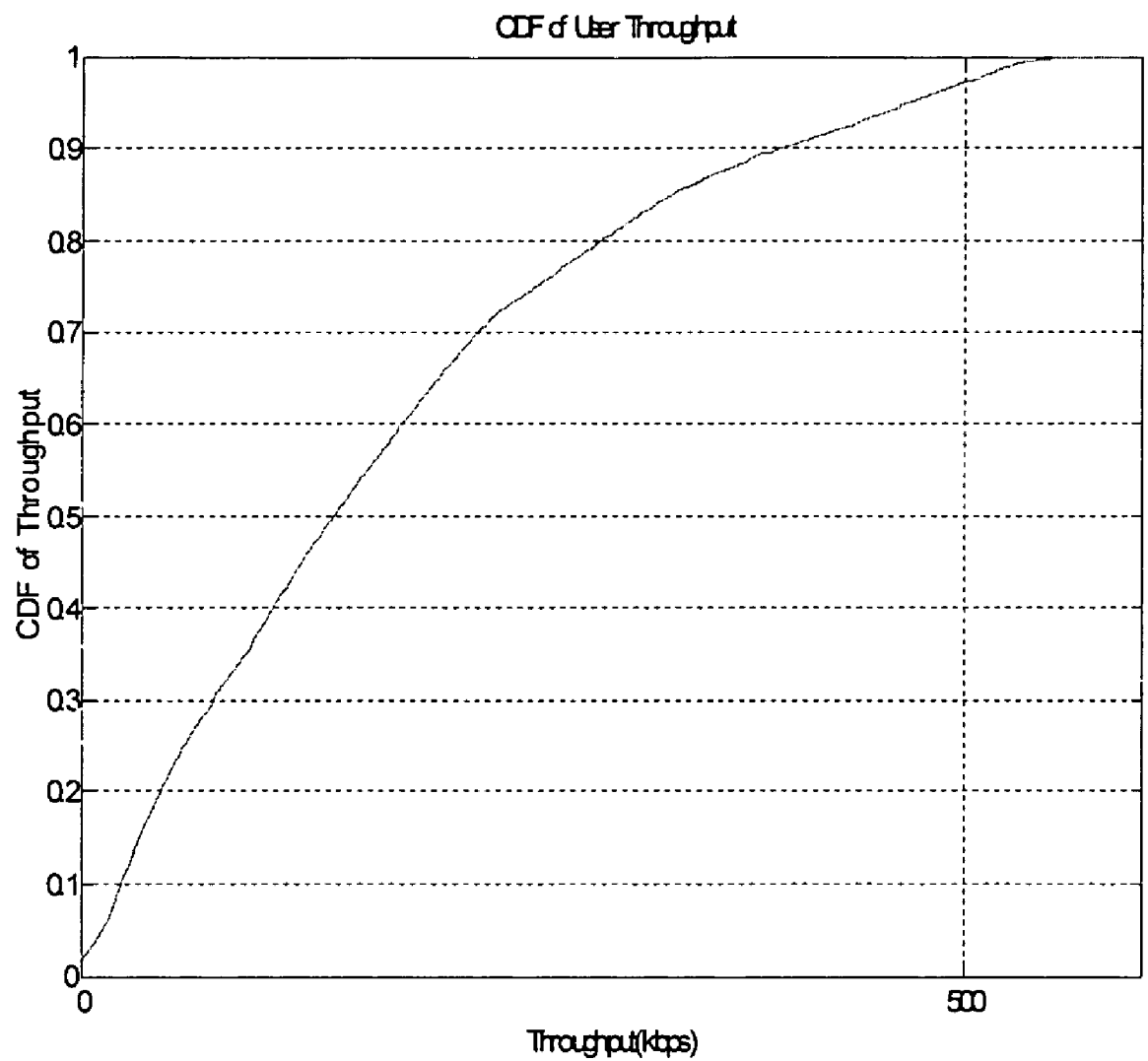
FIG. 5 depicts a Cumulative Distribution Function of throughput for a simulation.

FIG. 5 depicts results of throughput for Cumulative Distribution Function of a simulation for 2500 frames SLS result in which 250 frames are transmitted each trial over 10 trials. The sector spectrum efficiency is 0.9377 whereas 5% user throughput is 11.7 kbps (0.0063). Basic simulation parameters are listed as follows:

| | |
|---|---|
| BW | 10 Mhz |
| Frequency reuse | 1 |
| Cell deployment | 3 sectors/cell and 19 cell wrap-around |
| The number of users | 10/sector |
| The number of strong interference | 8 |
| Channel model | e-ITU Ped B 3 km/h |
| Permutation mode | Wimax UL PUSC |
| Site-to-Site distance | 500 m |

For the simulation, some approximation assumptions for input parameters were performed. First, because accurate short term $SNR_i$ is difficult to estimate, the long term average is used as an approximation: $SNR_i = SNR(i)_{average}$. Accordingly, $SE_{loss}$ is represented as:

$$SE_{loss}(i) \approx \log\left(1 + \frac{\Delta I_i}{NI_i}\right) - \log\left(1 + \frac{\Delta I_i}{NI_i + P_{Noise} \times SNR(i)_{average}}\right)$$

In the case of OLPC, the path loss estimation will be the long term average, i.e, for slow fading. The fast fading is difficult to track. So, slow fading was used for path loss estimation in this simulation.

Techniques described with regard to FIG. 1 may achieve significant gains compared to the uplink power control algorithms listed below, as shown in Table 1:

TABLE 1

SE Performance Comparison

| Algorithm Type | Sector spectrum efficiency | Improvement (%) |
|---|---|---|
| Full Power (No Power Control) | 0.6308 | 47% |
| SNR Target Based | 0.6913 (best result for all SNR target) | 34% |
| IoT Based Algorithms | 0.801 (best result for documents) | 16% |

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   determining spectrum efficiency gain for a first base station based on a first transmitter power level;
   determining spectrum efficiency loss for a second at least one base station based on the first transmitter power level; and
   selectively setting transmitter power for a mobile station based on the spectrum efficiency gain and spectrum efficiency loss by increasing the transmitter power level if the spectrum efficiency gain is less than the spectrum efficiency loss and decreasing the transmitter power level if the spectrum efficiency gain is greater than the spectrum efficiency loss.

2. The method of claim 1, wherein determining spectrum efficiency gain comprises determining:

$$SE_{gain} = \log\left(1 + \frac{\frac{\Delta P}{PL_0}}{NI_0 + \frac{P_0}{PL_0}}\right).$$

3. The method of claim 1, wherein determining spectrum efficiency loss comprises determining:

$$SE_{loss} = \sum_{i=1}^{N} SE_{loss}(i), \text{ wherein}$$

$$SE_{loss}(i) = \log\left(1 + \frac{\Delta I_i}{NI_i}\right) - \log\left(1 + \frac{\Delta I_i}{S_i + NI_i}\right).$$

4. The method of claim 1, further comprising:
   determining path loss from a mobile station to at least one base station.

5. The method of claim 4, wherein the determining path loss comprises neighboring base stations transmitting path loss to the first base station.

6. The method of claim 4, wherein the determining path loss comprises the first base station estimating path loss from the mobile station to base stations other than the first base station.

7. The method of claim 4, wherein a mobile station performs the determining path loss for at least one base station based in part on a preamble signal.

8. The method of claim 7, further comprising:
   transmitting noise plus interference level from the first base station to the mobile station, wherein the mobile station determines the spectrum efficiency gain and loss based on the noise plus interference level and the path loss.

9. The method of claim 4, further comprising:
   transmitting information from a mobile station to a first base station, wherein the first base station performs the determining path loss for at least one base station based on the information.

10. The method of claim 9, wherein the information comprises preamble signal strength and preamble total signal strength.

11. The method of claim 9, wherein the first base station performs the selectively setting transmitter power and further comprising: transmitting the first transmitter power level to the mobile station.

12. The method of claim 11, wherein the first base station performs the selectively setting transmitter power when data traffic is transmitted.

13. The method of claim 1, wherein the first base station comprises a home sector base station.

14. The method of claim 1, wherein the mobile station performs the selectively setting transmitter power to the first transmitter power level.

15. A mobile station comprising:
   logic to transmit signals to a base station at a first power level, wherein the first power level is based in part on spectrum efficiency gain and spectrum efficiency loss, wherein spectrum efficiency gain is relative to a first base station, and wherein spectrum efficiency loss is relative to a second base station, wherein the transmitter power level is increased if the spectrum efficiency gain is less than the spectrum efficiency loss and the transmitter power level is decreased if the spectrum efficiency gain is greater than the spectrum efficiency loss.

16. The mobile station of claim 15, wherein the spectrum efficiency gain and spectrum efficiency loss are based in part on path loss and noise plus interference level for at least one base station.

17. The mobile station of claim 15, wherein the spectrum efficiency gain is based on the following relationship:

$$SE_{gain} = \log\left(1 + \frac{\frac{\Delta P}{PL_0}}{NI_0 + \frac{P_0}{PL_0}}\right).$$

18. The mobile station of claim 15, wherein the spectrum efficiency loss is based on the following relationship:

$$SE_{loss} = \sum_{i=1}^{N} SE_{loss}(i), \text{ wherein}$$

$$SE_{loss}(i) = \log\left(1 + \frac{\Delta I_i}{NI_i}\right) - \log\left(1 + \frac{\Delta I_i}{S_i + NI_i}\right).$$

19. The mobile station of claim 15, further comprising:
   logic to determine path loss based in part on a preamble signal;
   logic to determine spectrum efficiency gain and loss based in part on noise plus interference level transmitted from the first base station to the mobile station and based in part on the path loss; and
   logic to determine the first power level based in part on a comparison between the spectrum efficiency gain and loss.

20. The mobile station of claim 15, further comprising:
   logic to transmit information to the first base station, wherein the first base station is to determine spectrum efficiency gain and loss based in part on the information and logic to set the first power level at a level specified by the first base station.

21. The mobile station of claim 20, wherein the information comprises preamble signal strength and preamble total signal strength.

22. A system comprising:
   at least one base station and a mobile station, wherein the mobile station is to transmit signals to at least one base station at a first power level, wherein the first power level is based on a comparison between spectrum efficiency gain and spectrum efficiency loss, the spectrum efficiency gain is for a first base station, and the spectrum efficiency loss is for a second base station, wherein the transmitter power level is increased if the spectrum efficiency gain is less than the spectrum efficiency loss and the transmitter power level is decreased if the spectrum efficiency gain is greater than the spectrum efficiency loss.

23. The system of claim 22, wherein the first base station comprises:
   logic to transmit noise plus interference level to the mobile station; and
   the mobile station comprises:
      logic to determine path loss based in part on a preamble signal;
      logic to determine spectrum efficiency gain and loss based in part on noise plus interference level transmitted from the first base station to the mobile station and based in part on the path loss; and
      logic to determine the first power level based in part on a comparison between the spectrum efficiency gain and loss.

24. The system of claim 23, wherein the noise plus interference level comprises noise plus interference level of the at least one base station.

25. The system of claim 22, wherein:
   the mobile station comprises:
      logic to transmit information to the first base station and logic to set the first power level at a level specified by the first base station; and
   the first base station comprises:
      logic to determine spectrum efficiency gain and loss based in part on the information and logic to transmit the first power level to the mobile station.

26. The system of claim 25, wherein the information comprises preamble signal strength and preamble total signal strength.

* * * * *

UNITED STATES PATENT AND TRADEMARK OFFICE
CERTIFICATE OF CORRECTION

PATENT NO.        : 8,219,136 B2                                   Page 1 of 1
APPLICATION NO.   : 12/322903
DATED             : July 10, 2012
INVENTOR(S)       : Yang et al.

It is certified that error appears in the above-identified patent and that said Letters Patent is hereby corrected as shown below:

In the Claims

Claim 1, in column 7, at line 5 after, -- second -- delete "at least one".

Signed and Sealed this
Thirteenth Day of May, 2014

Michelle K. Lee
*Deputy Director of the United States Patent and Trademark Office*